United States Patent [19]

Schuster

[11] Patent Number: 4,973,964
[45] Date of Patent: Nov. 27, 1990

[54] METHOD FOR ORIENTING A RADAR INSTALLATION AGAINST A TARGET

[75] Inventor: Manfred Schuster, Eckental, Fed. Rep. of Germany

[73] Assignee: Diehl GmbH & Co., Nuremberg, Fed. Rep. of Germany

[21] Appl. No.: 469,289

[22] Filed: Jan. 24, 1990

[30] Foreign Application Priority Data

Feb. 9, 1989 [DE] Fed. Rep. of Germany ....... 3903801

[51] Int. Cl.$^5$ ............................................ G01S 13/66
[52] U.S. Cl. ...................................... 342/5; 342/359; 342/75
[58] Field of Search .................. 342/5, 7, 75, 165, 359

[56] References Cited

U.S. PATENT DOCUMENTS

| | | | |
|---|---|---|---|
| 2,479,565 | 8/1949 | Grossman | 342/165 X |
| 2,942,257 | 6/1960 | Huntington | 342/165 |
| 4,241,349 | 12/1980 | Connell | 342/7 |
| 4,758,840 | 7/1988 | Dardenne et al. | 342/75 X |

FOREIGN PATENT DOCUMENTS 2209790  7/1977  Fed. Rep. of Germany .......... 342/5

Primary Examiner—Thomas H. Tarcza
Assistant Examiner—Mark Hellner
Attorney, Agent, or Firm—Scully, Scott, Murphy & Presser

[57] ABSTRACT

A method for orienting a radar installation which possesses an at least approximatingly axial-symmetrical antenna radiation or beam characteristic towards a target. The radar beam which is emitted by the radar installation is reflected or scattered back at the target and the backscattered radar beam is evaluated or plotted in a measurement evaluating device of the radar installation for purposes of determining or identifying the target. Employed is a target with three target elements which are arranged in the corners of an at least approximately equilateral triangle, the centerpoint of which corresponds to the desired target point, in which there is effected a separating of the three radar signals which are reflected or scattered back by the three target elements, and that from the values of the amplitudes of the three backscattered radar signals, through the utilization of the measurement evaluating circuit, there is determined the position of the target point which is located between the target elements.

8 Claims, 1 Drawing Sheet

U.S. Patent   Nov. 27, 1990   4,973,964
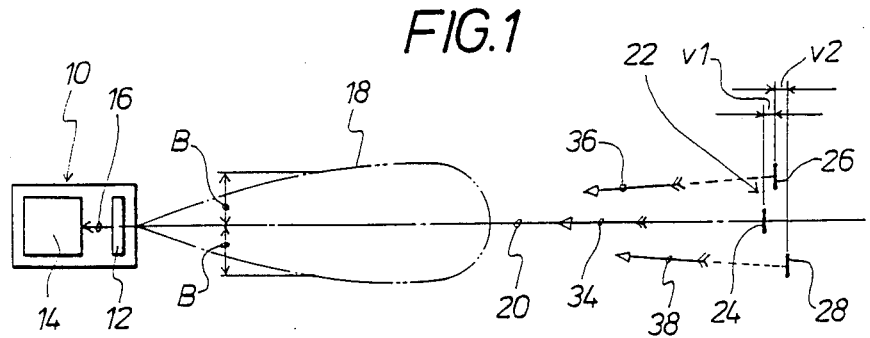
FIG.1
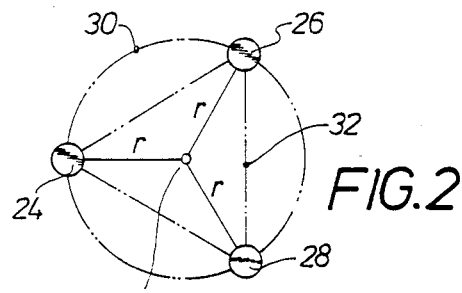
FIG.2
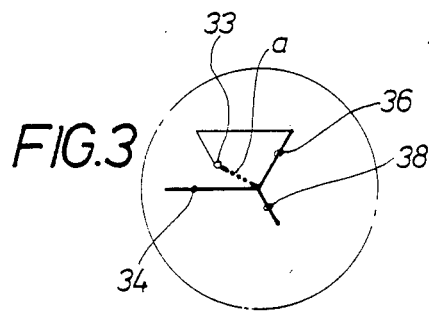
FIG.3
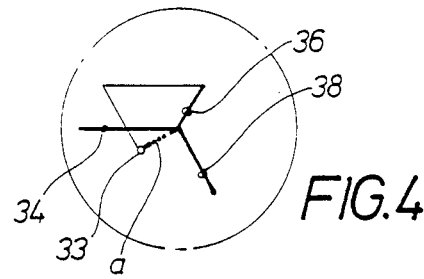
FIG.4
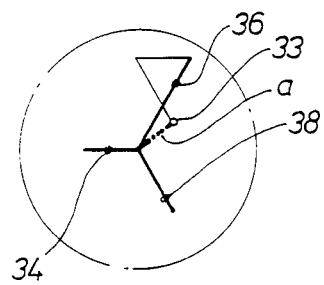
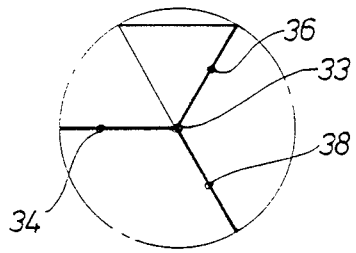
FIG.5   FIG.6

METHOD FOR ORIENTING A RADAR INSTALLATION AGAINST A TARGET

BACKGROUND OF THE INVENTION

1. Field of the Invention

The present invention relates to a method for orienting a radar installation which possesses an at least approximatingly axial-symmetrical antenna radiation or beam characteristic towards a target, wherein the radar beam which is emitted by the radar installation is reflected or scattered back at the target and the backscattered radar beam is evaluated or plotted in a measurement evaluating device of the radar installation for purposes of determining or identifying the target.

2. Discussion of the Prior Art

With regard to radar installations there is frequently encountered the task of having to optimally orient the radar installation towards a target in space commencing from a positionally fixed reference system. The orientation of the radar antenna of the radar installation is hereby carried out, in general, through a pivoting of the radar antenna; in essence, pivoting the transmitting and receiving antenna of the radar installation in a direction towards the target which is to be identified or determined. For this purpose, by way of example over a considerable period of time lasting until the present, a triple-mirror or reflector of suitable size has been arranged in the desired target position. Through the pivoting of the transmitting and receiving antenna of the radar installation and in the variation of the antenna beam direction caused thereby, at a concurrent control over the amplitude of the radar signal which is reflected or scattered back from the target, an attempt is made to achieve an optimum orientation or homing of the transmitting-receiving antenna of the radar installation against the target. The adjusting procedure; in effect, the displacement or pivoting of the transmitting-receiving antenna of the radar installation is terminated as soon as the amplitude of the radar signal which is reflected from the target reaches a maximum. In accordance with this adjustment, an iterative method comes into application, which necessitates a not insignificant demand on expenditures of time which is quite significant. A further drawback of this known method for target determination or identification consists in the limited accuracy in the adjustability, which is predicated on the fact that for the adjustment, there is employed the relatively broad major lobe of the antenna radiation or beam characteristic. The broader the major lobe of the antenna beam characteristic, the less accurate becomes the adjustment of the radar installation with respect to the target.

SUMMARY OF THE INVENTION

Accordingly, it is an object of the present invention to provide a method of the above-mentioned type which evidences a comparatively high degree of accuracy in adjustment, whereby the adjustment can concurrently be effectuated within a relatively short period of time.

The foregoing object is inventively attained in that there is employed a target with three target elements which are arranged in the corners of an at least approximately equilateral triangle, the centerpoint of which corresponds to the desired target point, in which there is effected a separating of the three radar signals which are reflected or scattered back by the three target elements, and that from the values of the amplitudes of the three backscattered radar signals, through the utilization of the measurement evaluating circuit, there is determined the position of the target point which is located between the target elements. In connection with the three target elements; for instance, this can relate to triple-reflectors or mirrors, which are equipped with a suitable radar backscatter cross-section. A precise positioning of the three target elements can be implemented with the aid of an optical target device, which may pertain; for example, to a target telescope. In the optical target device there can be marked the location of the corner point of the at least approximatingly equilateral triangle. From the radar installation there is emitted or radiated a radar beam with an at least approximatingly axial-symmetrical antenna beam or radiation characteristic, and which is reflected or scattered back towards the radar installation from the three target elements. In order to be able to distinguish the three backscattered radar signals which are received by the radar installation from each other, there is effectuated their separation. With the aid of the measurement evaluating circuit of the radar installation, it is then possible in a time-saving manner, to determine the location of the target point from the amplitude values of the three backscattered radar signals, as a consequence of which there is obtained the further advantage that, besides the high degree of precision or accuracy in the adjustment and the short period of time for the adjustment, it is possible to attain a direct display of the offset of the target point; in essence, the deviation between the position of the transmitting-receiving antenna of the radar installation relative to the target point which is located between the three target elements.

The separating of the radar signals which are backscattered or reflected from the three target elements is carried out with the utilization of a frequency-modulated radar beam; preferably on the basis of differing distance frequencies of the backscattered radar signals. When instead of a frequency-modulated radar beam there is employed a pulsed radar beam, then the separating of the radar signals which are backscattered from the three target elements is preferably effectuated on the basis of the different traveling times for the backscattered radar signals. In a radar installation which employs a pulsed radar beam, this can relate to a pulse radar installation or to a continuous wave-radar installation, whose pulses are modulated upon. The method operates independently of the aspect as to whether there is employed either a pulsed or a frequency-modulated radar beam.

The three target elements for the separating of the backscattered radar signals are axially offset with regard to each other in the direction between the radar installation and the target. The minimum possible axial offset is obtained directly from the (radial) distance-resolution capacity of the radar installation.

Inasmuch as the axial offset of the target elements the results in the formation of an amplitude error in the backscattered radar signals, there can be carried out a compensation for this amplitude error in the measurement evaluating circuit, in order to be able to achieve an extremely high degree of precision or accuracy in the adjustment.

The distance of the three target elements from the central target point and the half-width of the antenna beam characteristics are preferably correlated with each other in order to be able to achieve a high degree of adjusting precision or accuracy.

In comparison with the above-described method which employs a single target, by means of the inventive method there can also be achieved a comparatively high precision or accuracy in adjustment. This significantly higher adjusting precision is substantiated in that the evaluation of the measurement is not carried out by means of the relatively wide maximum of the main or major lobe of the antenna beam characteristic, but rather takes place in the region of the flanks or step sides of the curves of the antenna beam characteristics. Inasmuch as along the sides of the curves of the antenna beam characteristics there is given a comparatively high angular steepness, there is achieved a comparatively high adjusting sensitivity. This high sensitivity in the adjustment, in turn, again asserts itself in an advantageous positive manner on the adjusting accuracy or precision. A significant advantage of the inventive method can also be ascertained in that it is possible to provide for a direct display of the instantaneous deviation; meaning, the offset from the target point. As a result thereof, it is possible to realize a target-oriented adjustment with a relatively low demand on time.

The above-described adjusting method has as a prerequisite thereof, an at least approximatingly axial-symmetrical antenna beam characteristics for the radar installation. This prerequisite is frequently fulfilled, for example, in intelligent ammunition systems with radar installations. Small deviations from the ideal axial- symmetrical antenna beam characteristics lead, in general, to negligibly small errors in measurement which, in case of need, can be eliminated within the measurement evaluating circuit.

BRIEF DESCRIPTION OF THE DRAWINGS

Further details, features and advantages of the invention can now be readily ascertained from the following description of a method for the orientation or homing of a radar installation against a target, generally diagrammatically illustrated in the accompanying drawings; in which:

FIG. 1 illustrates a radar installation with its antenna beam characteristics, and a target which is located in front of the radar installation;

FIG. 2 illustrates an end view of the target viewed from the radar installation;

FIGS. 3 through 5 illustrate, respectively, three different offsets of the target point with the corresponding associated amplitude value of the radar signals which are reflected or backscattered from the three target elements; and FIG. 6 illustrates the adjusted condition of the radar installation in which the amplitude values of the three radar signals which are backscattered from the three target elements are equally high, such that there is no presence of an offset from a target point.

DETAILED DESCRIPTION

Referring to the drawings, FIG. 1 illustrates a radar installation 10, shown in a schematic block representation, which is adapted for the emission of either a frequency-modulated or a pulsed, in essence, a pulse- modulated radar beam. The radar installation 10 possesses a transmitting-receiving antenna 12 which, similarly, is only shown diagrammatically in the form of a block. Connected with the transmitting-receiving antenna 12 is a measurement evaluating device 14 which is identified by the arrow 16. The transmitting-receiving antenna 12 of the radar installation 10 possesses an at least approximating axial-symmetrical antenna beam or radiation characteristic 18. The axis of symmetry of the antenna beam characteristic 18 is designated with the reference numeral 20.

Arranged at a distance in front of the radar installation 10 is a target 22 which possesses three target elements 24, 26 and 28. As can be ascertained from FIG. 2, the three target elements 24, 26 and 28 which; for example, relate to a triple-reflector or mirror with a suitable radar backscatter cross-section, are arranged along an (imaginary) circular line 30 at uniform spacings from each other so as to form the corners of an (imaginary) equilateral triangle 32. The radial distance r of each target element 24, 26 and 28 from the central target point 33, through which there extends the axis of symmetry 20 of the antenna beam characteristics 18, is preferably correlated with the half-value beam width B (shown in FIG. 1) in such a manner, that 13 corresponds to the radius r.

From FIG. 1 of the drawings there can be ascertained that the three target elements 24, 26 and 28 are offset with respect to each other in an axial direction; in essence, along the direction of the axis of symmetry 20. The offset between the target elements 24 and 26 is designated in FIG. 1 with v1, and the offset between the target element 26 and the target element 28 with v2. Preferably, the offsets v1 and v2 are equally large. Through the offsets vi there is obtained a separating of the three radar signals which are backscattered or reflected from the three target elements 24, 26 and 28, and which are identified by the arrows 34, 36 and 38 in FIG. 1. Through this separation of the backscattered radar signals 34, 36 and 38 it is possible to detect in the measurement evaluating device 14 the amplitudes of the backscattered radar signals 34, 36 and 38 separately from each other, and to selectively display these separately from each other. In FIGS. 3 through 5 there are illustrated three different displays of amplitude values of the reflected or backscattered radar signals 34, 36 and 38, which respectively lead to corresponding offsets or deviations a of the target point 33. Through the display of the target point offset a it is possible, within the shortest period of time, to undertake a precise or accurate adjustment of the target point with a high degree of precision in adjustment. In FIG. 6 it is shown a precisely adjusted position, in which the values of the amplitude of the three backscattered radar signals 34, 36 and 38 are equally large, so that the target point 33 is located exactly in the center; meaning, it is precise alignment with the axis of symmetry 20 (see in FIG. 1) of the transmitting-receiving antenna 12 of the radar installation 10.

What is claimed is:

1. A method for orienting a radar installation processing a transmitting/receiving antenna that produces an approximately axial-symmetrical antenna beam against a target, said method comprising the steps of:
   (a) emitting a radar beam from the radar installation towards said target;
   (b) evaluating the backscattered radar beam reflected off of a set from three target elements which are arranged in the corners of an approximately equilateral triangle with a center point corresponding to a desired target point on said target for determination of the position of said target;

(c) separating the backscattered radar beam reflected from said set of three target elements into three backscattered radar signals; and (d) determining with a measurement evaluating device the location of the target point which is arranged between said target elements by measurement of the amplitude values of the three backscattered radar signals.

2. A method as claimed in claim 1, wherein the separating of the radar signals which are backscattered from said three target elements is implemented with a frequency-modulated radar beam based on differing distance frequencies of the backscattered radar signals.

3. A method as claimed in claim 1, wherein the separating of the radar signals which are backscattered from said three target elements is implemented with a pulsed radar beam based on differing traveling times for the backscattered radar signals.

4. A method as claimed in claim 1, wherein said three target elements are axially offset relative to each other in the direction between the radar installation and the target for effectuating separation of the backscattered radar signals.

5. A method as claimed in claim 4, wherein amplitude errors of the backscattered radar signals resulting from said axial offset of the target elements are compensated for in the measurement evaluating device.

6. A method as claimed in claim 1, wherein the distance of said three target elements from the central target point and the half-value in the width of the antenna beam characteristics are correlated to each other.

7. An arrangement for the directional adjustment of a radar beam for determining the position of a target, said means comprises:
  a radar installation having a transmitting/receiving antenna for providing said radar beam; and
  target means positioned at a distance in front of said radar installation, said target means having a set of three reflective target elements arranged in a circular pattern with a radius measured from a central target point which corresponds to the axis of symmetry of said radar beam and at uniform spacings, thereby forming an equilateral triangle, said three reflective target elements are additionally offset with respect to each other in an axial direction.

8. Arrangement for the directional adjustment of a radar beam for determining the position of a target as claimed in claim 7, comprising a measurement evaluating device for individually measuring the amplitude of a set of backscattered radar signals reflected off said three reflective target elements.

* * * * *

UNITED STATES PATENT AND TRADEMARK OFFICE
CERTIFICATE OF CORRECTION

PATENT NO. : 4,973,964

DATED : November 27, 1990

INVENTOR(S) : Manfred Schuster

It is certified that error appears in the above-identified patent and that said Letters Patent is hereby corrected as shown below:

Column 4, lines 57 & 58, Claim 1: "processing" should read as --possessing--

Signed and Sealed this

Fifth Day of May, 1992

Attest:

DOUGLAS B. COMER

*Attesting Officer*   Acting Commissioner of Patents and Trademarks